Jan. 20, 1948.  E. M. WOOCK  2,434,730
VINEYARD PLOW
Filed Dec. 29, 1945  2 Sheets-Sheet 2
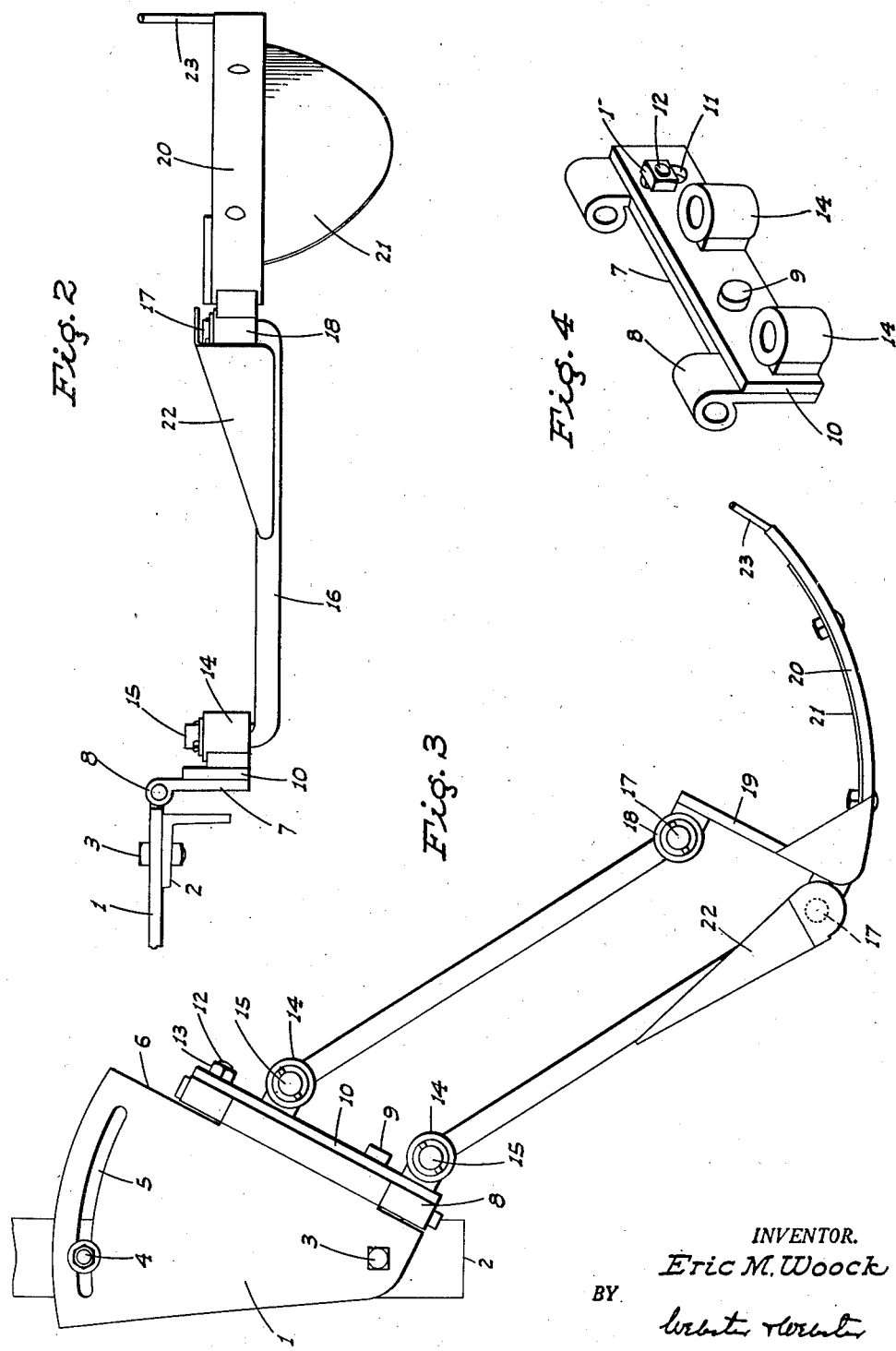
INVENTOR.
Eric M. Woock
BY
ATTYS Patented Jan. 20, 1948

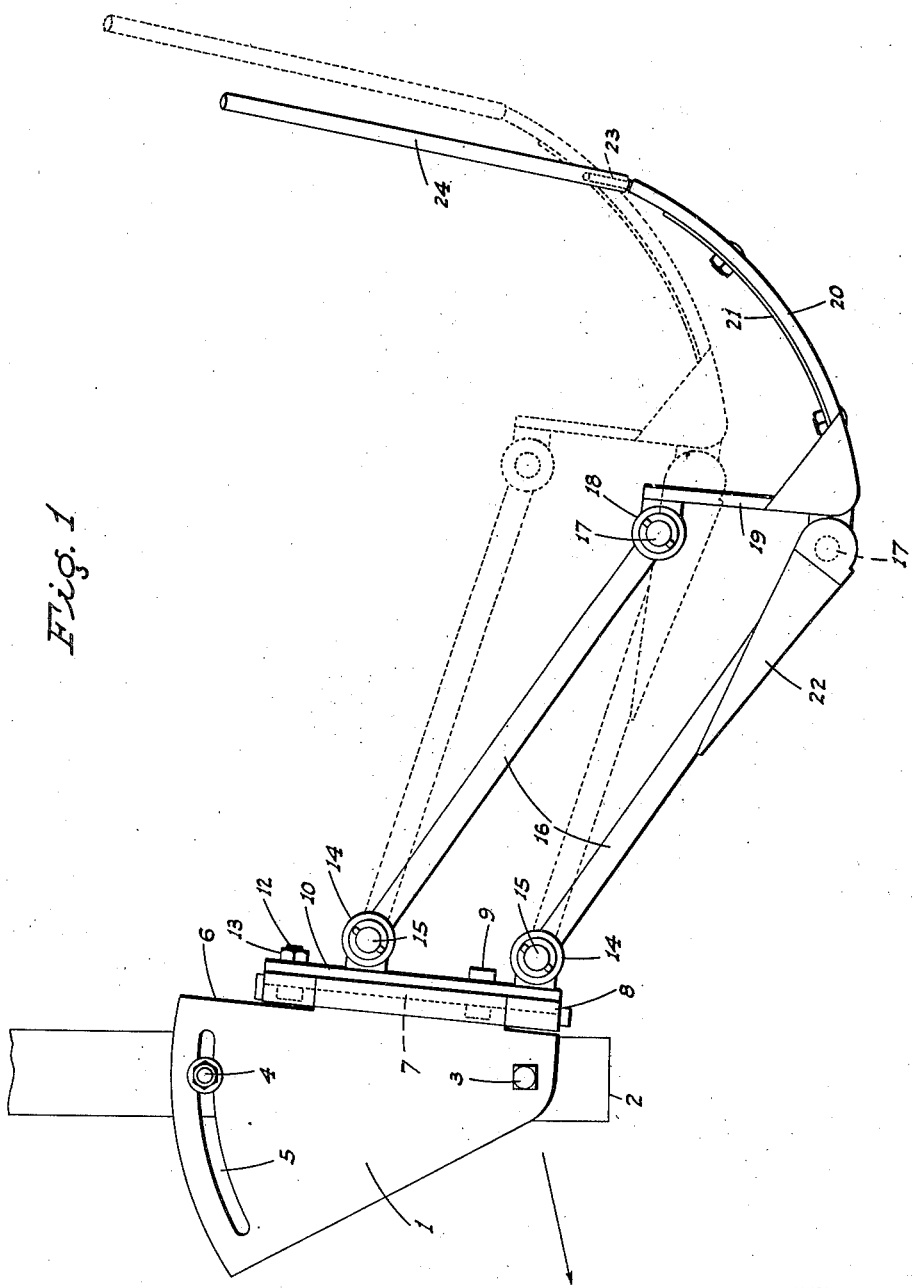

2,434,730

UNITED STATES PATENT OFFICE 2,434,730

VINEYARD PLOW

Eric M. Woock, Lodi, Calif.

Application December 29, 1945, Serial No. 638,192

2 Claims. (Cl. 97—137)

1

This invention relates in general to vineyard plows, and in particular is directed to an improved vineyard plow of the type which includes a plow blade mounted for lateral shifting movement whereby to permit the plow to work lengthwise of a row between the vines and yet swing laterally to clear the vine trunks.

One object of the present invention is to provide a vineyard plow having a plow blade mounting arranged so that the blade is laterally movable but remains at the same angle to the line of draft at all times and regardless of the lateral position of said blade, whereby the blade maintains a full and efficient cut in all positions thereof.

An additional object of the invention is to provide a vineyard plow, as in the preceding paragraph, in which said plow blade mounting comprises, between a draft member and a plow blade supporting member, a pair of parallel draft links disposed in horizontally spaced relation whereby the plow blade remains at a predetermined angle to the draft member and consequently to the line of draft.

A further object is to provide means in a vineyard plow, as above, whereby the working angle of the plow may be altered without altering the parallel relationship of the draft links.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a plan view of the vineyard plow showing in full lines its normal working position, and showing in dotted lines its working position when swung laterally inwardly to avoid a vine trunk.

Figure 2 is a side elevation of the implement.

Figure 3 is a plan view similar to Fig. 1 but shows the attachment plate in a different position of adjustment.

Figure 4 is a perspective view of a dual adjustment plate structure.

Referring now more particularly to the characters of reference on the drawings, the improved vineyard plow comprises a horizontal attachment plate I secured to a draft member 2 which extends transversely of the line of draft, and which draft member may be the rear frame portion of a

2 disc gang frame, a draft sled connected behind a tractor, or a draft member direct-connected to the tractor. The horizontal attachment plate I seats on top of the draft member 2 and is secured thereto for angular horizontal adjustment by means of a pair of transversely spaced bolts 3 and 4, the bolt 4 riding in a slot 5 cut through the plate I concentric to the other bolt 3 which provides the pivot about which the plate swings. It will thus be seen that the attachment plate I can be adjusted to alter the angle in a horizontal plane of the rear edge 6 of said plate relative to the line of draft. A depending rearwardly facing supporting flange plate 7 is hinged, as at 8, along the rear edge 6 of plate I for swinging movement about an axis parallel to said edge. A projecting pivot pin 9 is mounted on the rear face of the plate 7. Mounted on this pin 9 is another plate 10 which lies in face relation to the plate 7 and pivots about such pin 9 for vertical adjustment relative to the plate 7. One end of the plate 10 is slotted as at 11 and moves over a bolt 12 projecting from the plate 7 which bolt carries a nut 13 whereby the two plates may be secured in any relatively adjusted position. A pair of transversely spaced bosses 14 are formed on the rear face of the plate 10 and are disposed with their axes vertical, and upstanding trunnions 15 formed on the forward ends of a pair of rigid draft links 16 are turnably secured in said bosses 14, the trunnions projecting into said bosses from below.

The draft links 16 are disposed in parallel relationship and at their rear ends are formed with other upturned trunnions 17 which project upwardly through and are secured in connection with corresponding bosses 18 fixed on the front of another rigid, transversely extending supporting plate 19 disposed parallel to the supporting plates 7 and 10. A rigid, blade supporting bracket 20 is fixed in connection with the outer end portion of the member 19 and extends rearwardly in a horizontal plane at a laterally inward curve. A plow blade 21 is detachably secured on and projected downwardly from the bracket 20; said blade being correspondingly curved and facing forwardly and laterally inwardly.

The outermost link 16 is fitted on the outside and adjacent its rear end with a vine trunk engaging shoe 22, while the outer end of bracket 20 is fitted with a rigid angularly upstanding stem 23 on which a tubular bar or handle 24 may be removably mounted.

In operation of the above described vineyard plow it normally works in a laterally outwardly disposed position, as shown for example in full lines in Figs. 1 and 2; the side draft of the blade 15 tending to maintain the plow in such position, and in which position the plow is disposed between the vines of a row. When the plow approaches a vine, the shoe 22 engages the trunk thereof and deflects the plow laterally inwardly, whereby said plow may pass the vine without damage thereto. After the blade 21 has passed each vine the plow is returned to its normal working position in the row by any suitable means, either mechanical or power actuated, but here shown as the upstanding handle 24, in which case the operator rides on a trailing sled (not shown). The handle 24 may be manipulated after the blade 21 passes each vine to immediately return the blade 21 to working position between the vines of the row.

As the supporting members 10 and 19, together with the draft links 16, form a pivotally connected parallelogram assembly it will be seen that the blade 21 maintains the same working angle relative to the line of draft regardless of the relative lateral position of said blade. As a consequence the blade 21 takes a full and efficient cut at all times, and regardless of whether it is working between the vines in a row, or is deflected laterally to clear a vine.

If it is desired to alter the working angle of the blade 21 relative to the line of draft, this is accomplished by merely unloosening the nut on the bolt 4 which rides in the slot 5 and then adjusting the plate 1 horizontally. In Figs. 1 and 3, the plate 1 is shown in different positions of angular adjustment. By reason of the described structure the working angle of blade 21 relative to the line of draft can be altered without interfering with the pivotally connected parallelogram assembly of members 10 and 19 and draft links 16.

By reason of the fact that the supporting member 7 is hinged, as at 8, the plow may float vertically independently of its lateral position, which is a desirable feature and permits the blade 21 to follow ground contour. When different soil conditions make it desirable to change the depth of cut of the blade 21 this may be accomplished by adjusting the plate 10 relative to the plate 7 through the medium of the adjustment pivot 9, bolt 12 and nut 13 and slot 11, without otherwise affecting the operation of the other parts.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A vineyard plow, comprising a draft member, a pivotally connected parallelogram assembly including parallel end supporting members extending transversely of the line of draft of the draft member, draft links pivotally attached at their ends to said parallel supporting members, means connecting one of said supporting members to the draft member with said assembly extending in rearward and laterally outwardly angled relation to said line of draft, a plow blade mounted in connection with the other one of said supporting members; said means including a horizontal attachment plate secured to the draft member for angular adjustment in a horizontal plane, and said one supporting member being hinged to the attachment plate for up and down swinging motion about a horizontal axis extending transversely of the line of draft of the draft member.

2. A vineyard plow comprising a draft element, a rearwardly facing plate secured on and hinged relative to the draft element for up and down swinging movement, a second plate mounted in face to face relation with the first plate and pivoted to said first plate for adjustment relative thereto in a vertical plane, a pair of spaced draft links pivoted to the second plate for swinging movement in a substantially horizontal plane, said links being parallel to each other, a rigid plate at the outer ends of said parallel links and to which plate the links are pivotally mounted, and a plow blade secured to said last named plate.

ERIC M. WOOCK.

REFERENCES CITED

The following references are of record in the file of this patent:

UNITED STATES PATENTS

| Number | Name | Date |
|--------|------|------|
| 383,541 | Patric | May 29, 1888 |
| 517,289 | Neisler | Mar. 27, 1894 |
| 2,185,634 | Jacobs et al. | Jan. 2, 1940 |